US009942636B2

(12) United States Patent
Tanabe et al.

(10) Patent No.: US 9,942,636 B2
(45) Date of Patent: Apr. 10, 2018

(54) VEHICLE-MOUNTED SPEAKER SYSTEM

(71) Applicant: ALPINE ELECTRONICS, INC., Shinagawa-ku, Tokyo (JP)

(72) Inventors: Kei Tanabe, Fukushima (JP); Ryo Ito, Fukushima (JP); Akio Suzuki, Fukushima (JP)

(73) Assignee: ALPINE ELECTRONICS, INC., Tokyo (JP)

( * ) Notice: Subject to any disclaimer, the term of this patent is extended or adjusted under 35 U.S.C. 154(b) by 0 days.

(21) Appl. No.: 15/664,718

(22) Filed: Jul. 31, 2017

(65) Prior Publication Data

US 2018/0063610 A1    Mar. 1, 2018

(30) Foreign Application Priority Data

Aug. 23, 2016  (JP) .................. 2016-163021

(51) Int. Cl.
| | |
|---|---|
| *H04B 1/00* | (2006.01) |
| *H04R 1/02* | (2006.01) |
| *B60R 11/02* | (2006.01) |
| *H04R 9/06* | (2006.01) |
| *H04R 9/02* | (2006.01) |
| *H04R 7/18* | (2006.01) |
| *H04R 7/12* | (2006.01) |
| *B60R 11/00* | (2006.01) |

(52) U.S. Cl.
CPC .......... *H04R 1/025* (2013.01); *B60R 11/0217* (2013.01); *H04R 7/127* (2013.01); *H04R 7/18* (2013.01); *H04R 9/025* (2013.01); *H04R 9/06* (2013.01); *B60R 2011/0024* (2013.01); *H04R 2400/11* (2013.01); *H04R 2499/13* (2013.01)

(58) Field of Classification Search
CPC .......... H04R 1/025; H04R 7/127; H04R 7/18; B60R 11/0217
See application file for complete search history.

(56) References Cited

U.S. PATENT DOCUMENTS

| | | | |
|---|---|---|---|
| 2010/0150389 A1* | 6/2010 | Sumiyama | ............... H04R 1/22 381/386 |
| 2017/0289702 A1* | 10/2017 | Inoue | ..................... H04R 19/04 |

FOREIGN PATENT DOCUMENTS

| | | |
|---|---|---|
| EP | 1 791 389 | 5/2007 |
| EP | 2 154 906 | 2/2010 |

(Continued)

OTHER PUBLICATIONS

Extended European Search Report for EP17187002 dated Jan. 31, 2018, 8 pgs.

*Primary Examiner* — Simon King
(74) *Attorney, Agent, or Firm* — Brinks Gilson & Lione

(57) ABSTRACT

A vehicle-mounted speaker system achieves improvement in the weather resistance against a vehicle exterior environment and enables degradation in sound quality to be prevented. In the vehicle-mounted speaker system, a supporting member separating a vehicle interior space from a vehicle exterior space is provided with an opening. The supporting member supports a speaker, and a rear cover covering the back of the speaker closes the opening. The rear cover includes an annular flexible member supported by the supporting member, and a non-flexible vibrating plate supported by an inner portion of the annular flexible member. An enclosed space is defined between the rear cover having such a configuration and a diaphragm of the speaker.

16 Claims, 2 Drawing Sheets

(56) References Cited

FOREIGN PATENT DOCUMENTS

| | | |
|---|---|---|
| JP | S56 85485 | 7/1981 |
| JP | 62-39391 | 3/1987 |
| JP | S6251900 | 3/1987 |
| JP | H09 271091 | 10/1997 |

* cited by examiner

VEHICLE-MOUNTED SPEAKER SYSTEM

RELATED APPLICATION

The present application claims priority to Japanese Patent Application Number 2016-163021, filed Aug. 23, 2016, the entirety of which is hereby incorporated by reference.

BACKGROUND

1. Field of the Invention

The present invention relates to a vehicle-mounted speaker system in which sound from a speaker mounted on a supporting member separating a vehicle interior space from a vehicle exterior space is emitted into a vehicle cabin.

2. Description of the Related Art

In a vehicle-mounted speaker system in which a speaker is directly mounted on a supporting member (partition wall) separating a vehicle exterior space, such as the inside of a door or an engine compartment, from a vehicle interior space, water droplets and dust may enter the inside of the door through a clearance for window glass, and adverse effects, such as radiant heat, oil, and the like of the engine, are commonly produced in the engine compartment. Therefore, the environment in a vehicle exterior space is very severe compared with the environment in a passenger cabin.

As an example of the related art for a vehicle-mounted speaker system of this kind, as described in Japanese Unexamined Utility Model Registration Application Publication No. 62-39391, there has been proposed a system in which an opening is provided for a door trim and an inner panel, and in which sound from a speaker attached to the inner panel is emitted into a cabin through the opening. In addition, in the system, a rear cover formed of an elastic material covers the back of the speaker. The rear cover closes an opening on the back of a cylindrical-shaped object surrounding the speaker, and an enclosed space is defined between the back of the speaker and the rear cover.

In the vehicle-mounted speaker system having such a configuration, the rear cover covers the back of the speaker which faces the inside of a door which is a vehicle exterior space. Therefore, rain and dust that have entered the inside of the door may be prevented from entering the inside of the speaker. Further, the rear cover is formed of a material having high elasticity and flexibility, and the rear cover is deformed due to vibration of a diaphragm that is a component of the speaker. Therefore, gentle damping is added to vibration of the diaphragm, improving the low frequency sound characteristics.

However, in the vehicle-mounted speaker system of the related art which is disclosed in Japanese Unexamined Utility Model Registration Application Publication No. 62-39391, the rear cover is formed of an elastic material. The elastic material exhibits multiple resonances based on its expansion and contraction, deformation, and the like. Therefore, multiple peaks are present in the frequency characteristics, resulting in a problem of degradation in sound quality.

SUMMARY

The present disclosure is made to address such an issue of the related art, and an object of the present disclosure is to provide a vehicle-mounted speaker system that achieves improvement in the weather resistance against a vehicle exterior environment and that enables the degradation in sound quality to be prevented.

To attain this object, a vehicle-mounted speaker system provided by the present disclosure includes a supporting member, a speaker, and a rear cover. The supporting member is disposed between a vehicle interior space and a vehicle exterior space and is provided with an opening through which the vehicle interior space communicates with the vehicle exterior space. The speaker is supported by the supporting member in such a manner as to oppose the opening. The rear cover closes the opening so as to define an enclosed space between the rear cover and the speaker. The rear cover includes an annular flexible member bended in cross section supported by the supporting member, and a non-flexible vibrating plate which is supported by an inner portion of the annular flexible member and whose pressure receiving area is larger than a pressure receiving area of the annular flexible member.

In the vehicle-mounted speaker system having such a configuration, the rear cover that closes the opening covers the back of the speaker supported by the supporting member. Therefore, the weather resistance against a change in temperature, wind and rain, dust, and the like in a vehicle exterior space may be improved. In addition, when the rear cover receives sound pressure due to vibration of the diaphragm of the speaker, only displacement of the non-flexible vibrating plate and slight deformation of the annular flexible member occur. Therefore, resonance produced based on expansion and contraction, deformation, and the like of the rear cover may be precluded, and the frequency characteristics may be made flat, enabling degradation in sound quality to be prevented.

In the above-described configuration, the speaker includes a frame attached to the supporting member, a diaphragm that is held by the frame and that opposes the rear cover with the enclosed space interposed therebetween, a voice coil attached to the diaphragm, and a magnetic circuit that is supported by the frame and that is disposed in the vehicle interior space. Thus, heat from the voice coil disposed in the magnetic gap of the magnetic circuit is released on the vehicle interior space side. Therefore, heat may be prevented from being accumulated in the enclosed space surrounded by the diaphragm and the rear cover.

In this case, the size of the rear cover is not particularly limited with respect to the size of the diaphragm. However, when the outside diameter of the annular flexible member is smaller than the diameter of the diaphragm, the size of the opening provided for the supporting member may be made small. Therefore, reduction in the mechanical strength of the supporting member may be suppressed, and interference between the edge of diaphragm and the annular flexible member may be avoided. Accordingly, the rear cover may be disposed close to the speaker, achieving reduction in apparatus size.

In the above-described configuration, the shape of the non-flexible vibrating plate is not particularly limiting. However, when the non-flexible vibrating plate has a circular bowl shape so as to bulge on the vehicle exterior space side, the stiffness of the non-flexible vibrating plate may be improved. Even when the diaphragm of the speaker and the rear cover operate in opposite phase, a state in which the diaphragm comes into contact with the non-flexible vibrating plate may be prevented.

In the above-described configuration, in the case where the drive frequency band of a driving unit that drives the speaker is lower than the resonant frequency of the enclosed space, and where the vibration frequency band of the speaker is lower than the resonant frequency, a peak produced due to resonance of the enclosed space may be also precluded, enabling the frequency characteristics to be made flat.

The vehicle-mounted speaker system provided by the present disclosure achieves improvement in the weather resistance against a vehicle exterior environment, and enables resonance produced based on expansion and contraction, deformation, and the like of the rear cover to be precluded, achieving prevention of degradation in sound quality.

DETAILED DESCRIPTION OF THE PREFERRED EMBODIMENTS

Figure 1:
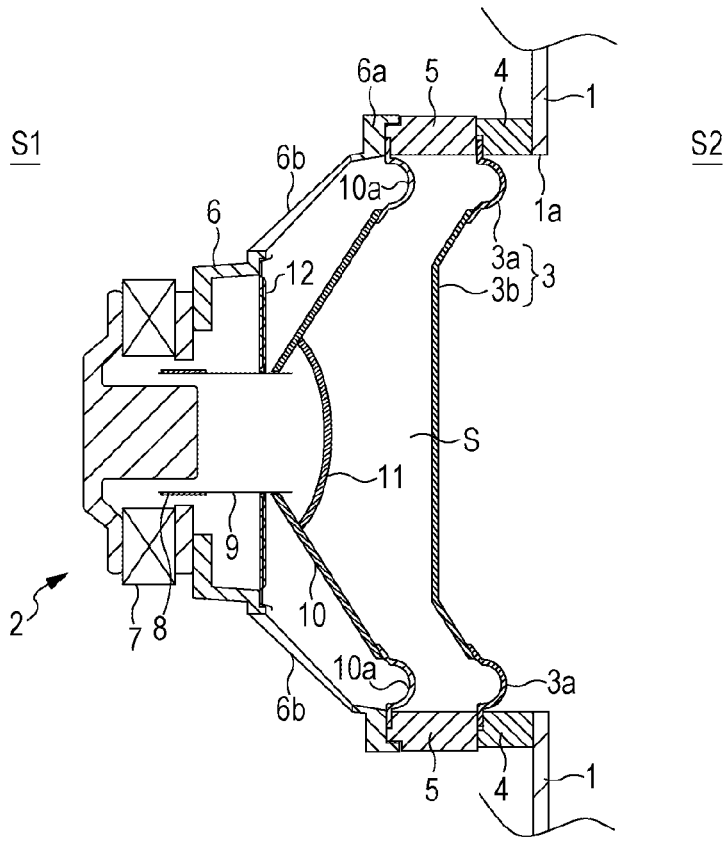
FIG. 1 is a sectional view of a vehicle-mounted speaker system according to a first exemplary embodiment.

Embodiments of the present invention will be described with reference to the drawings. As illustrated in FIG. 1, in a vehicle-mounted speaker system according to a first exemplary embodiment of the present invention, a speaker 2 is supported by a supporting member 1 that separates a vehicle interior space S1 from a vehicle exterior space (for example, an engine compartment) S2, and a rear cover 3 is supported by the supporting member 1 in such a manner as to cover the back of the speaker 2. The supporting member 1 is provided with an opening 1a through which the vehicle interior space S1 communicates with the vehicle exterior space S2. The rear cover 3 is fixed to the supporting member 1 with a gasket 4 interposed between the rear cover 3 and the supporting member 1, in such a manner as to close the opening 1a. The speaker 2 is disposed forward of the rear cover 3 with a spacer 5 interposed between the speaker 2 and the rear cover 3. An enclosed space S is defined between a diaphragm 10 of the speaker 2 which is described below and the rear cover 3. It is desirable that the enclosed space S be nearly perfectly sealed. However, if the enclosed space S is perfectly sealed, expansion and contraction occur due to a change in temperature. Therefore, air holes are desirably provided at appropriate positions.

The speaker 2 mainly includes a frame 6 having a substantially truncated-cone shape in cross section, a magnetic circuit 7 fixed to the bottom of the frame 6, a voice coil 8 that is disposed in a magnetic gap of the magnetic circuit 7 and that is actuated through electromagnetic interaction upon energization, a cylindrical bobbin 9 on which the voice coil 8 is wound, a substantially conical diaphragm 10 attached to the bobbin 9, a circular-bowl shaped cap 11 that closes an inner space of the diaphragm 10, and a damper 12 that supports the bobbin 9 and the diaphragm 10 in an elastic manner.

The frame 6 has an annular-shaped flange 6a on the periphery side, and the flange 6a is fixed to the supporting member 1 together with the spacer 5 and the gasket 4 by using a means such as screws. The diaphragm 10 has an edge 10a on the periphery side, and the edge 10a is attached to the flange 6a of the frame 6. Multiple notched holes 6b are formed on a surface of the frame 6. Sound produced through vibration of the diaphragm 10 passes through the notched holes 6b, and is emitted to the vehicle interior space S1.

The rear cover 3 includes an annular flexible member 3a formed of a highly flexible material such as soft rubber, and a non-flexible vibrating plate 3b formed of a metal material, such as a heat-resistant resin or aluminum. The annular flexible member 3a and the non-flexible vibrating plate 3b form an integral unit by using a means such as bonding. The annular flexible member 3a is an annular body having a semicircular shape in cross section, and its periphery is pinched between the cylindrical gasket 4 and the cylindrical spacer 5. The gasket 4 is a ring-shaped packing for sealing the vehicle interior space S1 and the vehicle exterior space S2 from each other, and has a diameter of the same size as the diameter of the opening 1a. The spacer 5 is a cylindrical member interposed between the gasket 4 and the flange 6a of the frame 6, and the edge 10a of the diaphragm 10 and the annular flexible member 3a of the rear cover 3 are disposed apart by a distance corresponding to the thickness of the spacer 5 (a dimension in the left-right direction in FIG. 1). The non-flexible vibrating plate 3b is a planar member whose periphery is bent. As described above, the enclosed space S is defined between the diaphragm 10 and the rear cover 3. It is not intended that the non-flexible vibrating plate 3b be formed of a material having no flexibility. The non-flexible vibrating plate 3b may be formed of a material having slight flexibility as long as the non-flexible vibrating plate 3b has stiffness that is sufficiently higher than the stiffness of the annular flexible member 3a and the flexibility of the non-flexible vibrating plate 3b does not affect the acoustic characteristics to a large extent.

It is desirable that the width of the annular flexible member 3a be as small as possible to the extent that vibration of the non-flexible vibrating plate 3b is not hindered, and that the pressure receiving area of the non-flexible vibrating plate 3b be larger than the pressure receiving area of the annular flexible member 3a. Thus, resonance produced due to expansion and contraction, deformation, and the like of the annular flexible member 3a may be reduced to the maximum extent possible. In addition, it is desirable that expansion and contraction of the material of the annular flexible member 3a be prevented by bending the annular flexible member 3a in cross section, and that the non-flexible vibrating plate 3b be made to easily vibrate.

The rear cover 3 closing the opening 1a is a member exposed to the vehicle exterior space S2. Therefore, the material properties, the thickness, and the like of the annular flexible member 3a and the non-flexible vibrating plate 3b need to be selected in consideration of the environment of the vehicle exterior space S2. For example, when the vehicle exterior space S2 is an engine compartment, a material resistant to radiant heat, oil, and the like of an engine may be used.

In the vehicle-mounted speaker system having such a configuration, an audio signal is input from a drive signal generating device described below to the voice coil 8 of the speaker 2, and the bobbin 9 and the diaphragm 10 vibrate in the left-right direction in FIG. 1. Then, a negative pressure and a positive pressure are alternately produced in the enclosed space S on the back side of the diaphragm 10. In accordance with this, the rear cover 3 is also displaced in the left-right direction in FIG. 1. The rear cover 3 has a configuration in which the annular flexible member 3a having high flexibility is used to support an outer portion of the non-flexible vibrating plate 3b having high stiffness. When the rear cover 3 receives a sound pressure due to vibration of the diaphragm 10, the non-flexible vibrating plate 3b is displaced and only the annular flexible member 3a is deformed. Therefore, resonance produced based on the expansion and contraction, deformation, and the like of the rear cover 3 may be precluded, enabling the frequency characteristics to be made flat over a wide frequency band. In addition, the inertial resistance of the non-flexible vibrating plate 3b adds gentle damping to vibration of the diaphragm 10, and the low frequency sound characteristics are also improved.

Figure 2:
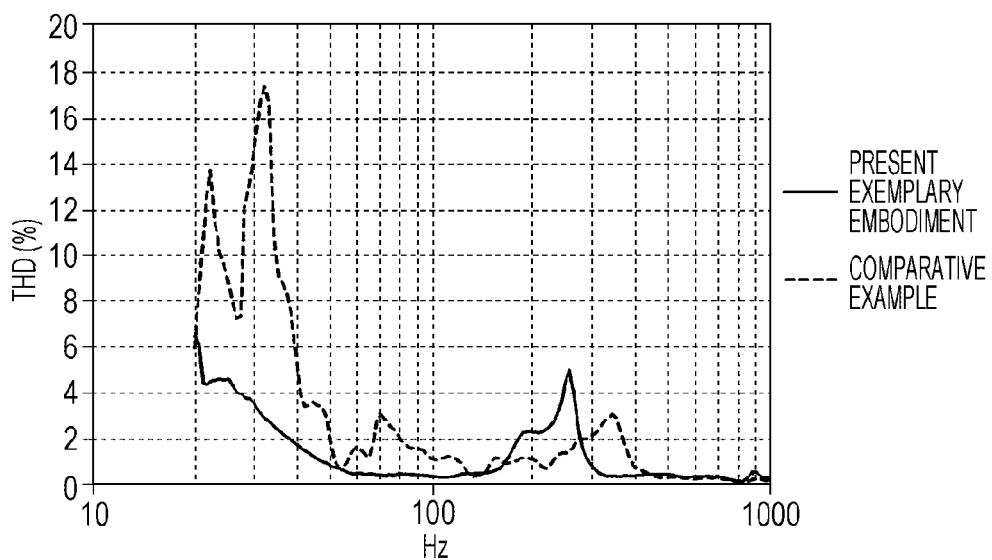
FIG. 2 is a diagram for describing the relationship between distortion rate and frequency.

FIG. 2 is a diagram illustrating frequency characteristics obtained in a state in which a speaker operates. The horizontal axis represents frequency, and the vertical axis represents distortion rate (THD). The solid line in FIG. 2 indicates the first exemplary embodiment using the rear cover 3 including the annular flexible member 3a and the non-flexible vibrating plate 3b. The broken line indicates a comparative example using a rear cover formed only of an elastic material.

As illustrated in FIG. 2, in the case of the comparative example in which an rear cover is formed only of an elastic material, the elastic material exhibits multiple resonances based on its expansion and contraction, deformation, and the like. Therefore, the elastic material has frequency characteristics having multiple peaks. In particular, a large peak is present in a low frequency band equal to or smaller than 100 Hz, resulting in degradation in sound quality in a deep bass range. In contrast, in the case of the first exemplary embodiment, only the annular flexible member 3a is deformed due to vibration of the diaphragm 10, and the non-flexible vibrating plate 3b supported by an inner portion of the annular flexible member 3a is just displaced while remaining in a flat shape. Therefore, resonance produced based on expansion and contraction, deformation, and the like of the rear cover 3 may be precluded. As a result, though a peak at a frequency of about 250 Hz which is a resonant frequency of the enclosed space S is present, the frequency characteristics may be made flat over the other wide frequency band. Accordingly, degradation in sound quality in a deep bass range may be suppressed.

Figure 3:
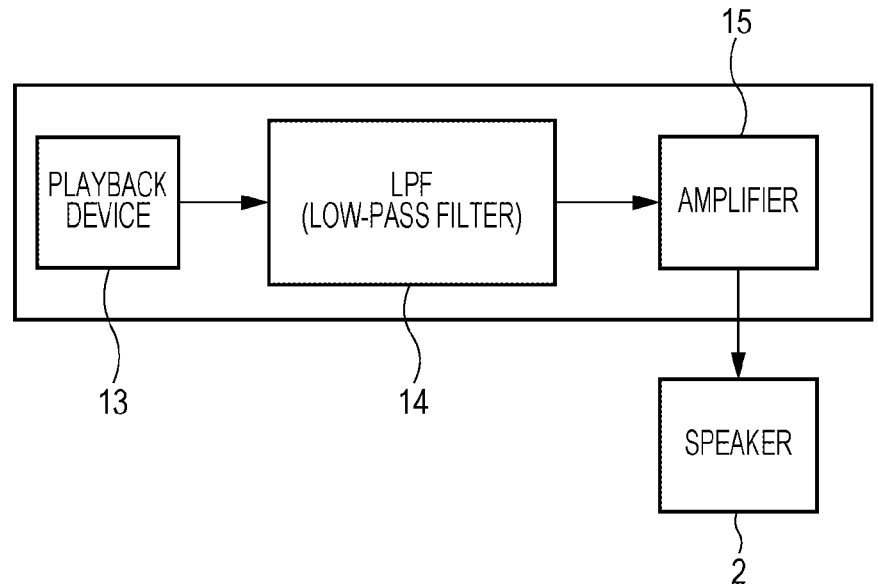
FIG. 3 is a block diagram illustrating a drive signal generating device.

FIG. 3 is a block diagram illustrating the drive signal generating device (driving unit) that inputs an audio signal to the speaker 2. As illustrated in FIG. 3, an audio signal reproduced by a playback device 13 such as a disk player passes through a low-pass filter (LPF) 14, and is then amplified by an amplifier 15 to input the resulting signal to the speaker 2. Therefore, the speaker 2 operates in a frequency band lower than the signal frequency at which cutting is performed by the low-pass filter 14. The speaker 2 used in the first exemplary embodiment is a low frequency woofer whose operating frequency is 20 Hz to 150 Hz, and this operating frequency (20 Hz to 150 Hz) is lower than the above-described resonant frequency (250 Hz) of the enclosed space S. Therefore, a speaker system having good low frequency sound characteristics may be achieved.

As described above, in the vehicle-mounted speaker system according to the first exemplary embodiment, the rear cover 3 closes the opening 1a provided for the supporting member 1 separating the vehicle interior space S1 from the vehicle exterior space S2, and covers the back of the speaker 2 supported by the supporting member 1. Therefore, provision of the rear cover 3 enables improvement in the weather resistance of the vehicle exterior space S2 against a change in temperature, wind and rain, dust, and the like. Further, the rear cover 3 includes the annular flexible member 3a supported by the supporting member 1 with the gasket 4 interposed between the supporting member 1 and the annular flexible member 3a, and the non-flexible vibrating plate 3b supported by the inner portion of the annular flexible member 3a. When the rear cover 3 receives sound pressure due to vibration of the diaphragm 10 of the speaker 2, the non-flexible vibrating plate 3b is displaced, and only the annular flexible member 3a is deformed. Therefore, resonance produced based on expansion and contraction, deformation, and the like of the rear cover 3 may be precluded, and the frequency characteristics may be made flat, preventing degradation in sound quality.

The vehicle-mounted speaker system has a configuration in which the magnetic circuit 7 that is a component of the speaker 2 is disposed in the vehicle interior space S1, and in which sound produced by vibration of the diaphragm 10 is emitted through the notched holes 6b of the frame 6 to the vehicle interior space S1. Therefore, heat of the voice coil 8 disposed in the magnetic gap of the magnetic circuit 7 is radiated to the vehicle interior space S1. This may prevent heat from being accumulated in the enclosed space S surrounded by the diaphragm 10 and the rear cover 3.

In the vehicle-mounted speaker system according to the first exemplary embodiment, the speaker 2 mounted on the supporting member 1 is a low frequency woofer, and the operating frequency (20 Hz to 150 Hz) of the speaker 2 is lower than the resonant frequency (250 Hz) of the enclosed space S. Therefore, a peak produced due to resonance of the enclosed space S may be also precluded, and the frequency characteristics may be made flat, achieving a speaker system having good low frequency sound characteristics.

Figure 4:
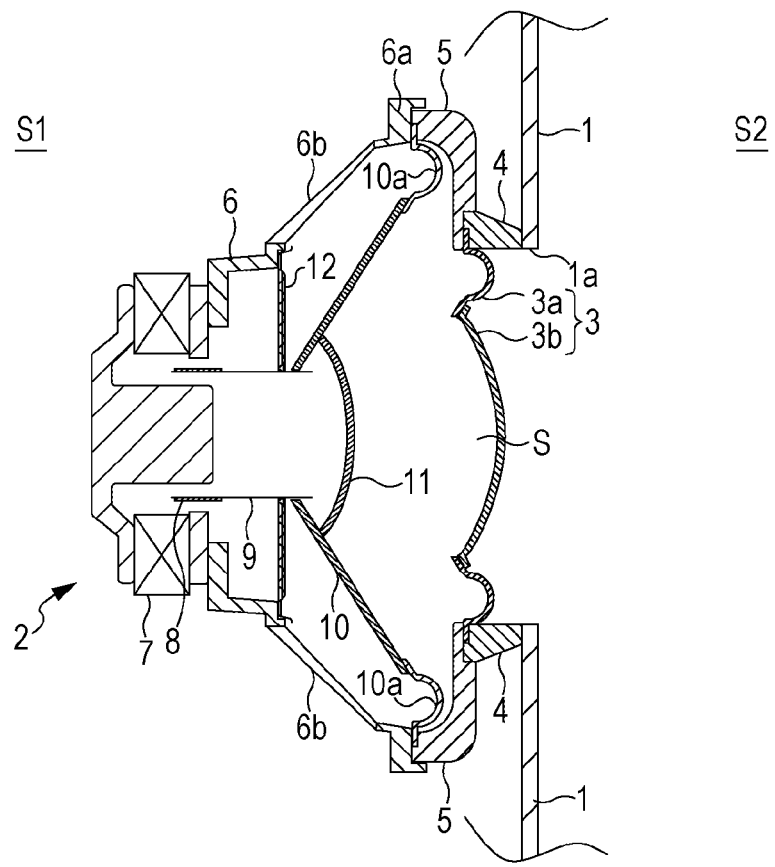
FIG. 4 is a sectional view of a vehicle-mounted speaker system according to a second exemplary embodiment.

FIG. 4 is a sectional view of a vehicle-mounted speaker system according to a second exemplary embodiment of the present invention. Components corresponding to those in FIG. 1 are designated with identical reference numerals.

The vehicle-mounted speaker system illustrated in FIG. 4 is different from the vehicle-mounted speaker system in the first exemplary embodiment in that the outside diameter of the annular flexible member 3a of the rear cover 3 is smaller than the diameter of the diaphragm 10 of the speaker 2 and in that the non-flexible vibrating plate 3b of the rear cover 3 is formed like a circular bowl in such a manner as to bulge on the vehicle exterior space S2 side. The remaining configuration is basically the same.

That is, the supporting member 1 is provided with the opening 1a which is relatively small and through which the vehicle interior space S1 communicates with the vehicle exterior space S2. The opening 1a is closed by the rear cover 3 having the same diameter. The spacer 5 is a ring-shaped member whose thickness (the dimension in the left-right direction in FIG. 4) is relatively small, and the annular flexible member 3a of the rear cover 3 is pinched between the inner portion of the spacer 5 and the gasket 4. The flange 6a of the frame 6 is fixed to an outer portion of the spacer 5, and the edge 10a of the diaphragm 10 is supported by the flange 6a. The diameter of the diaphragm 10 is set larger than the diameter of the opening 1a and the rear cover 3. The edge 10a of the diaphragm 10 opposes the spacer 5 in an outside space in the radial direction of the rear cover 3. The non-flexible vibrating plate 3b of the rear cover 3 is formed like a circular bowl in such a manner as to bulge toward the vehicle exterior space S2, and the enclosed space S is defined between the diaphragm 10 and the rear cover 3.

In the vehicle-mounted speaker system according to the second exemplary embodiment having such a configuration, the outside diameter of the rear cover 3 is set smaller than the diameter of the diaphragm 10 of the speaker 2. Therefore, the size of the opening 1a closed by the rear cover 3 may be made smaller than the bore of the speaker 2.

Correspondingly, reduction in the mechanical strength of the supporting member 1 may be suppressed. Further, the edge 10a of the diaphragm 10 and the annular flexible member 3a of the rear cover 3 are disposed apart in the radial direction. Therefore, a state in which the edge 10a of the diaphragm 10 comes into contact with the annular flexible member 3a when the speaker 2 operates may be avoided, and reduction in apparatus size may be achieved by disposing the speaker 2 close to the rear cover 3.

In the vehicle-mounted speaker system according to the second exemplary embodiment, the non-flexible vibrating plate 3b of the rear cover 3 is formed like a circular bowl in such a manner as to bulge toward the vehicle exterior space S2. Therefore, the stiffness of the non-flexible vibrating plate 3b is improved so as to be unlikely to be deformed. In addition, even when the diaphragm 10 of the speaker 2 and the rear cover 3 operate in opposite phase, the diaphragm 10 may be made not to come into contact with the non-flexible vibrating plate 3b.

In the above-described exemplary embodiments, the case in which the diaphragm 10 of the speaker 2 and the non-flexible vibrating plate 3b of the rear cover 3 have a perfect circular shape, and in which the annular flexible member 3a of the rear cover 3 has an annular shape is described. These shapes are not limiting. The diaphragm 10 and the non-flexible vibrating plate 3b may have an elliptical shape or a track shape, and the annular flexible member 3a may have a corresponding shape.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A vehicle-mounted speaker system comprising:
a supporting member that is configured to be disposed between a vehicle interior space and a vehicle exterior space and that is provided with an opening through which the vehicle interior space communicates with the vehicle exterior space;
a speaker that is supported by the supporting member in such a manner as to oppose the opening; and
a rear cover that closes the opening so as to define an enclosed space between the rear cover and the speaker,
wherein the rear cover includes an annular flexible member bended in cross section supported by the supporting member, and a non-flexible vibrating plate which is supported by an inner portion of the annular flexible member and whose pressure receiving area is larger than a pressure receiving area of the annular flexible member.

2. The vehicle-mounted speaker system according to claim 1,
wherein the speaker includes a frame attached to the supporting member, a diaphragm that is held by the frame and that opposes the rear cover with the enclosed space interposed therebetween, a voice coil attached to the diaphragm, and a magnetic circuit that is supported by the frame and that is disposed in the vehicle interior space.

3. The vehicle-mounted speaker system according to claim 2,
wherein an outside diameter of the annular flexible member is smaller than a diameter of the diaphragm.

4. The vehicle-mounted speaker system according to claim 2,
wherein the non-flexible vibrating plate has a circular bowl shape in which the non-flexible vibrating plate bulges on the vehicle exterior space side.

5. The vehicle-mounted speaker system according to claim 1,
wherein a drive frequency band of a driving unit that drives the speaker is lower than a resonance frequency of the enclosed space.

6. A vehicle-mounted speaker supported by a supporting member that is configured to be disposed between a vehicle interior space and a vehicle exterior space and that is provided with an opening through which the vehicle interior space communicates with the vehicle exterior space, the vehicle-mounted speaker comprising:
a speaker that is configured to be supported by the supporting member in such a manner as to oppose the opening; and
a rear cover that is configured to close the opening so as to define an enclosed space between the rear cover and the speaker,
wherein the rear cover includes an annular flexible member bended in cross section supported by the supporting member, and a non-flexible vibrating plate which is supported by an inner portion of the annular flexible member and whose pressure receiving area is larger than a pressure receiving area of the annular flexible member.

7. The vehicle-mounted speaker according to claim 6,
wherein the speaker includes a frame attached to the supporting member, a diaphragm that is held by the frame and that opposes the rear cover with the enclosed space interposed therebetween, a voice coil attached to the diaphragm, and a magnetic circuit that is supported by the frame and that is disposed in the vehicle interior space.

8. The vehicle-mounted speaker according to claim 7,
wherein an outside diameter of the annular flexible member is smaller than a diameter of the diaphragm.

9. The vehicle-mounted speaker according to claim 7,
wherein the non-flexible vibrating plate has a circular bowl shape in which the non-flexible vibrating plate bulges on the vehicle exterior space side.

10. The vehicle-mounted speaker according to claim 6,
wherein a drive frequency band of a driving unit that drives the speaker is lower than a resonance frequency of the enclosed space.

11. A speaker configured to be supported by a supporting member disposed between a first space and a second space and having an opening, the speaker comprising:
A frame configured to be attached to the supporting member in such a manner that the speaker opposes the opening; and
a rear cover that is configured to close the opening so as to define an enclosed space between the rear cover and the speaker,
wherein the rear cover includes an annular flexible member bended in cross section and a non-flexible vibrating plate which is supported by an inner portion of the annular flexible member and whose pressure receiving area is larger than a pressure receiving area of the annular flexible member.

12. The speaker according to claim 11,
wherein the speaker includes a diaphragm that is held by the frame and that opposes the rear cover with the enclosed space interposed therebetween, a voice coil attached to the diaphragm, and a magnetic circuit that is supported by the frame and that is disposed in the vehicle interior space.

13. The speaker according to claim 12,
wherein an outside diameter of the annular flexible member is smaller than a diameter of the diaphragm.

14. The speaker according to claim 12,
wherein the non-flexible vibrating plate has a circular bowl shape in which the non-flexible vibrating plate bulges on the vehicle exterior space side.

15. The speaker according to claim 11,
wherein a drive frequency band of a driving unit that drives the speaker is lower than a resonance frequency of the enclosed space.

16. The speaker according to claim 12, wherein the frame includes a plurality of openings in a surface of the frame, whereby sound produced through vibration of the diaphragm passes through the plurality of frame openings.

* * * * *